United States Patent [19]
Shiobara et al.

[11] Patent Number: 6,001,901
[45] Date of Patent: Dec. 14, 1999

[54] EPOXY RESIN COMPOSITION

[75] Inventors: Toshio Shiobara; Eiichi Asano; Shigeki Ino; Kazutoshi Tomiyoshi, all of Usui-gun, Japan

[73] Assignee: Shin-Etsu Chemical Co., Ltd., Japan

[21] Appl. No.: 08/993,867

[22] Filed: Dec. 18, 1997

[30] Foreign Application Priority Data

Dec. 19, 1996 [JP] Japan ..................................... 8-354531

[51] Int. Cl.$^6$ ............................... C08K 3/36; C08L 63/02
[52] U.S. Cl. .......................... 523/443; 438/127; 523/440
[58] Field of Search ................................... 523/440, 443, 523/446; 438/127

[56] References Cited

FOREIGN PATENT DOCUMENTS 03174434  7/1991  Japan .

Primary Examiner—Robert Dawson
Assistant Examiner—D. Aylward
Attorney, Agent, or Firm—Millen, White, Zelano, & Branigan P.C.

[57] ABSTRACT

An epoxy resin composition comprising an epoxy resin, a curing agent, and an inorganic filler has a melt viscosity of at most 150 poise at 175° C. The inorganic filler has a BET specific surface area of 1.5–6 m$^2$/g and is such that when a 75/25 mixture of the inorganic filler and a bisphenol F type liquid epoxy resin is measured for viscosity at shear rates of 0.6/sec. and 10/sec. at a temperature of 25±0.05° C. by an E type viscometer, the ratio of the viscosity at 0.6/sec. to the viscosity at 10/sec. is at least 3.5/1. The amount of the inorganic filler loaded is 80–90% by weight of the composition. The composition is suitable for the encapsulation of matrix frames.

9 Claims, No Drawings

EPOXY RESIN COMPOSITION

This invention relates to an epoxy resin composition suitable as an encapsulant for a matrix frame.

BACKGROUND OF THE INVENTION

Epoxy resin compositions are often used as encapsulants (or molding compounds for semiconductor devices) for advanced thin packages. There is the tendency of loading epoxy resins with large amounts of submicron fillers having a mean particle size of less than 1 μm, desirably less than 0.5 μm for achieving both improved loading and minimized moisture pick-up. The fine filler as a whole has a very large specific surface area as compared with conventional fillers. The interfacial wetting between the resin and the filler is thus substantially exacerbated. This results in epoxy resin compositions having an extremely increased viscosity which makes it difficult to mold the compositions.

For the purpose of providing an epoxy resin composition having an increased filler loading and a reduced viscosity, we found that a filler loading of about 80 to 85% by weight and a viscosity of about 100 to 300 poise at 175° C. are achievable by blending a filler containing about 5 to 15% by weight of a spherical filler fraction having a particle size of about 0.5 μm. This type of filler has already been used in practice. On the other hand, the current trend is toward increasing the loading of filler for minimizing water absorption for improving solder reflow resistance. Particularly when a filler loading of more than 85% by weight is desired, conventionally used spherical fillers lead to a very high viscosity in a low shear region to cause die pad deformation, wire deformation and even line breakage.

When epoxy resin compositions loaded with large amounts of inorganic fillers and having a melt viscosity of at most 150 poise, especially at most 100 poise at 175° C. are molded using matrix frames, it is very difficult to control the flow of the resin. There arise the problems of non-uniform filling of first and second cavities with the resin and defects like voids and wire deformations. It is desired to overcome these problems.

SUMMARY OF THE INVENTION

Therefore, an object of the present invention is to provide a novel and improved epoxy resin composition having a melt viscosity of at most 150 poise at 75° C. and a capability of smoothly filling matrix frames without incurring defects like voids and conductor bends.

We have found that in the event epoxy resin compositions have a melt viscosity of at most 150 poise, especially at most 100 poise at 175° C., the above-mentioned problems cannot be solved by inorganic fillers which are regarded favorable in conventional compositions, but by inorganic fillers which are conventionally regarded unfavorable.

The present invention provides an epoxy resin composition comprising an epoxy resin, a curing agent, and an inorganic filler as essential components. The inorganic filler has a specific surface area of 1.5 to 6 $m^2/g$ as measured by the BET method and has such nature that when a kneaded 75/25 (wt%) mixture of the inorganic filler and a bisphenol F type liquid epoxy resin is measured for viscosity at shear rates of 0.6/sec. and 10/sec. at a temperature of 25±0.05° C. by an E type viscometer, the ratio of the viscosity at 0.6/sec. to the viscosity at 10/sec. is at least 3.5/1. The amount of the inorganic filler loaded is 80 to 90% by weight of the epoxy resin composition. The epoxy resin composition has a melt viscosity of at most 150 poise at 175° C.

When the epoxy resin composition of the invention is used as a molding compound in the encapsulation of semiconductor devices, especially matrix frames, the specific filler is effective for improving the filling capacity of the composition and avoiding defects like voids and conductor bends. The resin encapsulated semiconductor devices are thus highly reliable.

DETAILED DESCRIPTION OF THE INVENTION

The epoxy resin composition according to the invention contains an epoxy resin, a curing agent, and an inorganic filler as essential components.

The epoxy resin used herein may be selected from prior art well-known epoxy resins having at least two epoxy groups in a molecule, for example, bisphenol A type epoxy resins, bisphenol F type epoxy resins, phenol novodlak type epoxy resins, cresol novolak type epoxy resins, naphthalene type epoxy resins, biphenyl type epoxy resins, cyclopentadiene type epoxy resins, and polyfunctional epoxy resins. Preferred of these epoxy resins are naphthalene type epoxy resins and biphenyl type epoxy resins having a liquid crystal structure represented by the following structural formulae.

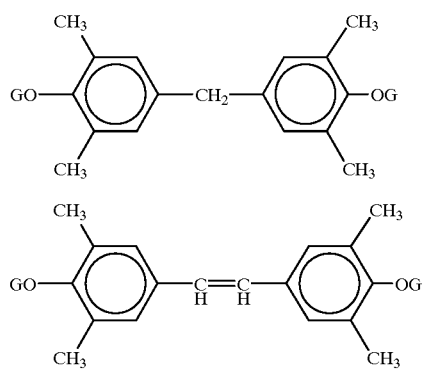
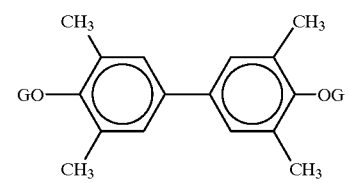

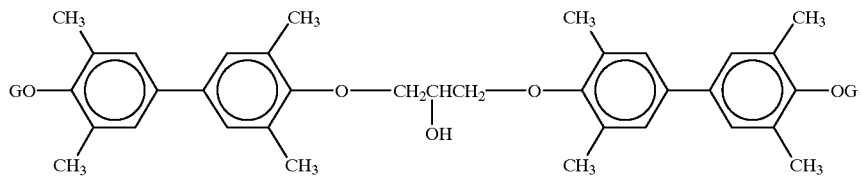

In the formulae, —OG is

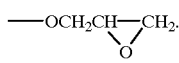

These epoxy resins should preferably have an overall chlorine content of less than 1,500 ppm, more preferably less than 1,000 ppm, and a water extractable chlorine content of less than 5 ppm as measured in an epoxy resin concentration of 50% by weight at 120° C. for 20 hours. If the overall chlorine content is more than 1,500 ppm and/or the water extractable chlorine content is more than 5 ppm, semiconductor devices encapsulated with such epoxy resins would become less reliable against humidity.

The curing agent may be selected from conventional well-known compounds used as a curing agent for epoxy resins. Phenolic resins are preferred curing agents. Any of phenolic resins having at least two phenolic hydroxyl groups in a molecule is useful. Exemplary phenolic resins are phenol novolak resins, cresol novolak resins, phenol aralkyl resins, naphthalene type phenol resins, cyclopentadiene type phenol resins, and triphenolalkane type phenol resins.

Like the epoxy resins, the phenolic resins should preferably have chloride and sodium ion contents of less than 10 ppm, especially less than 5 ppm when extracted at 120° C.

The epoxy resin and the phenolic resin are preferably mixed such that 0.5 to 1.6 mol, especially 0.6 to 1.4 mol of the phenolic hydroxyl group is available per mol of the epoxy group. Less than 0.5 mol of the phenolic hydroxyl group per mol of the epoxy group means a shortage of hydroxyl groups, which can lead to a greater proportion of homo-polymerization of epoxy groups and hence, a lower glass transition temperature. More than 1.6 mol of the phenolic hydroxyl group per mol of the epoxy group means a higher proportion of phenolic hydroxyl groups, which can lead to a lower reactivity, a lower crosslinking density and an insufficient strength.

In the epoxy resin composition of the invention, a curing promoter may be blended. The curing promoter may be selected from phosphorus compounds, imidazole derivatives, and cycloamidine derivatives. The amount of the curing promoter is preferably 0.01 to 10 parts by weight per 100 parts by weight of the epoxy resin and the phenolic resin combined.

The filler used in the epoxy resin composition of the invention is an inorganic filler which as a whole has a specific surface area of 1.5 to 6 m$^2$/g, preferably 2.5 to 5 m$^2$/g, as measured by the BET method. The inorganic filler is of such nature that when a kneaded mixture of 75% by weight of the inorganic filler and 25% by weight of a bisphenol F type liquid epoxy resin is measured for viscosity at shear rates of 0.6/sec. and 10/sec. at a temperature of 25±0.05° C. by an E type viscometer, the ratio of the viscosity at 0.6/sec. to the viscosity at 10/sec. (viscosity ratio, hereinafter) is at least 3.5/1.

With a specific surface area of less than 1.5 m$^2$/g, the epoxy resin composition has too low a viscosity in the low shear region to control its flow. With a specific surface area of more than 6 m$^2$/g, the epoxy resin composition has too high a viscosity and loses fluidity, causing the deformation of conductors and die pads.

If the viscosity ratio is less than 3.5/1, the composition enters a mold cavity as a turbulent flow past the gate outlet. Where a matrix frame is used, the concurrent casting of the composition into first and second cavities becomes difficult. As a result, the molding flow balance is disordered, incurring wire deformation and die pad shifts. It is noted that the viscosity ratio is preferably at least 3.6/1, more preferably at least 3.7/1. The upper limit of the viscosity ratio is usually 6.5/1 though not critical.

The bisphenol F type liquid epoxy resin used in the viscosity measurement is a bisphenol F type liquid epoxy resin having a viscosity of 30 to 40 poise at room temperature (25° C.) as measured by a Gardner-Holdt viscometer, for example. It is commercially available under the trade name of Epikote 807 from Yuka Shell Epoxy K.K.

When the filler is rated by the above-mentioned measurement, the rating should be made on a filler to be actually used. More particularly, most of the fillers used in semiconductor encapsulation have been surface treated with silane coupling agents. In the event such a surface treated filler is blended in an epoxy resin composition, the measurement should be made on that surface treated filler.

The type of the inorganic filler is not critical. Examples include fused silica as ground by a ball mill, spherical silica resulting from flame melting, spherical silica as prepared by the sol-gel method, crystalline silica (ex. quartz), alumina, boron nitride, aluminum nitride, silicon nitride, magnesia, and magnesium silicate. Where semiconductor elements produce a considerable heat release, it is desirable to use fillers having a greater thermal conductivity and a lower coefficient of expansion such as alumina, boron nitride, aluminum nitride and silicon nitride. They may be blended with fused silica.

Ultrafine silica such as aerosil may also be used. In the prior art, wet or dry ultrafine silica having a very large specific surface area of 100 to 300 m$^2$/g as typified by aerosil is added to ground silica in an amount of several percents as a countermeasure for preventing burring. In general, if ultrafine silica such as aerosil is solely used in a highly silica loaded composition as defined herein, there occurs a significant loss of fluidity. Nevertheless, the problem of fluidity loss can be avoided by properly adjusting the particle size distribution in the ultrafine region.

The shape of the inorganic filler is not critical. Fillers of flake, dendrite and spherical shapes may be used alone or in admixture of two or more. Among others, spherical fillers are most desirable for low viscosity and high loading.

The preferred filler used herein is an inorganic filler having a mean particle size (for example, weight-average diameter) of 4 to 30 μm, more preferably 10 to 25 μm, such a particle size distribution that fine particles having a particle size of at most 3 μm account for 10 to 40% by weight of the filler and the maximum particle size is less than 100 μm, more preferably less than 74 μm, and of course, a specific surface area of 1.5 to 6 m²/g, preferably 2.5 to 5 m²/g. It is noted that the mean particle size and particle size distribution are measurements by a laser diffraction particle size distribution meter. Such a particle size distribution is obtained by mixing plural fractions of filler. If the mean particle size is less, than 4 μm, such a filler would increase the viscosity of a resin composition loaded therewith so that the filler cannot be added in a large proportion. A mean particle size of more than 30 μm indicates a larger proportion of coarse particles which can cause gate clogging. If fine particles having a particle size of at most 3 μm are less than 10% by weight of the filler, closest packing would become insufficient and the melt viscosity of the composition would remain high. If fine particles having a particle size of at most 3 μm are more than 40% by weight of the filler, the filler at the interface would be insufficiently wetted with the resin due to the presence of too much fines, rather resulting in a composition with a higher viscosity. Desirably, fine particles having a particle size of at most 3 μm are contained in the filler in an amount of 10 to 30% by weight.

A fraction of the filler ranging from a mean particle size of 3 μm to ultrafine silica plays a very important role in achieving the closest packing of the filler, imparting thixotropy to the composition to reduce its viscosity, and controlling the flow of the composition. The fraction of the filler ranging downward from a mean particle size of 3 μm is desirably obtained by properly mixing ultrafine silica having a mean particle size of less than 0.05 μm and a specific surface area of 50 to 300 m²/g as typified by aerosil, a microparticulate filler having a mean particle size of 0.05 to 0.3 μm, and a filler having a mean particle size of 0.5 to 3 μm. The microparticulate filler having a mean particle size of 0.05 to 0.3 μm is desirably a spherical one having a specific surface a:ea of 10 to 40 m²/g, especially 15 to 40 m²/g. The filler having a mean particle size of 0.5 to 3 μm is also desirably a spherical one having a specific surface area of 5 to 40 m²/g, especially 5 to 30 m²/g. Typically there are blended 0 to 5% by weight of the ultrafine silica, 1 to 1.5% by weight of the microparticulate filler having a mean particle size of 0.05 to 0.3 μm, and 5 to 20% by weight of the filler having a mean particle size of 0.5 to 3 μm.

It can happen in the practice of the invention that the interfacial wetting between the resin and the filler becomes insufficient, resulting in an extremely high viscosity and a substantial variation of the viscosity ratio. The viscosity ratio is affected by a fine filler fraction having a mean particle size of at most 0.5 μm, especially in the range from ultrafine aerosil to 0.3 μm. The filler fraction in this range tends to agglomerate with the aid of vibration, and its influence becomes outstanding in the event of secondary agglomeration. For preventing secondary agglomeration and achieving sufficient wetting between the resin and the filler, it is recommended t. previously mix the fine filler fraction with the resin or to uniformly mix the fine filler fraction with another filler fraction or fractions in a mixer such as a ball mill prior to use.

The amount of the inorganic filler blended is preferably about 80 to 90% by weight of the entire epoxy resin composition. Differently stated, about 400 to 1,000 parts by weight of the inorganic filler is blended per 100 parts by weight of the epoxy resin and the curing agent combined. On this basis, epoxy resin compositions with less than 400 parts of the inorganic filler would have a relatively high coefficient of expansion and a high water absorption, leaving the risk that packages crack at high temperature during solder reflow. Epoxy resin compositions with more than 1,000 parts of the inorganic filler would become too viscous to mold.

In the epoxy resin composition of the invention, conventional well-known powders such as silicone rubber and gel, silicone-modified epoxy resins, silicone-modified phenol resins, and thermoplastic resins such as methyl methacrylate-butadiene-styrene copolymers may be blended as a stress reducing agent.

Also, brominated epoxy resins and antimony oxide may be added for imparting flame retardancy. Further, conventional well-known diluents may be added for reducing viscosity. Exemplary diluents include n-butyl glycidyl ether, phenyl glycidyl ether, styrene oxide, tert-butylphenyl glycidyl ether, dicyclopentadiene diepoxide, phenol, cresol, and tert-butylphenol. Still further, coupling agents such as silane coupling agents, titanium coupling agents, and aluminum coupling agents, pigments such as carbon black, and wettability modifiers and antifoaming agents such as nonionic surfactants, fluorinated surfactants and silicone fluids are added if desired.

With respect to the manufacturing process, an epoxy resin composition may be prepared by uniformly mixing the above-mentioned ingredients in a high speed mixer and fully kneading the mixture in a twin-roll mill or continuous kneader. The kneading temperature is desirably 50 to 110° C. After kneading, the composition is thinly sheeted, cooled, and pulverized.

The epoxy resin composition has a melt viscosity of at most 150 poise, preferably at most 100 poise at 175° C. as measured by a Kouka type flow tester. A melt viscosity of higher than 150 poise causes such troubles as shifting of conductors and tilting of die pads upon molding. The lower limit of the melt viscosity is usually 50 poise though not critical.

The epoxy resin composition of the invention may be used as a general purpose molding material although it is preferably used as an encapsulant for semiconductor devices, for example, multi-pin thin packages such as TQFP (thin quad flat package), TSOP (thin small outline package) and QFP (quad flat package), especially semiconductor devices with matrix frames. The molding technique used herein is typically transfer molding. The molding conditions include a temperature of 165 to 185° C. and 1 to 2 minutes.

When the epoxy resin composition is molded using matrix frames, there are obtained resin-encapsulated semiconductor devices featuring good filling and high reliability due to the elimination of defects such as voids, wire bends and die pad deformations.

EXAMPLE

Examples of the present invention are give below by way of illustration and not by way of limitation.

Examples 1–5 Comparative Examples 1–3

Fillers A to H were prepared by blending various silica fractions as shown in Table 1. The fillers were surface treated with 0.5% by weight of the filler of KBM 403 (γ-glycidoxypropyltrimethoxysilane, Shin-Etsu Chemical Co., Ltd.) before they were measured for particle size, specific surface area and viscosity. The measurements were carried out by the following methods.

Particle Size Distribution and Mean Particle Size

A particle size distribution was measured by a laser diffraction particle size distribution me:er, Sealus Laser Type 920 Granulometer by Sealus Co. A mean particle size is a weight-average diameter.

Specific Surface Area

A filler obtained by mixing silica fractions was measured for specific surface area by a specific surface area tester.

Viscosity Ratio

One gram of a bisphenol F type epoxy resin (Epikote 807 by Yuka Shell Epoxy K.K.) and 3 grams of a filler were weighed. They were fully mixed on a glass dish. Using an E type viscometer equipped with a R-U rotor cone, the mixture was measured for viscosity at shear rates of 0.6 s$^{-1}$ and 10 s$^{-1}$ at a temperature of 25±0.05° C. The ratio of the viscosity at 0.6 s$^{-1}$ to the viscosity at 10 s$^{-1}$ was calculated.

The results are shown in Table 1.

TABLE 1

| Silica fraction used | Filler | | | | | | | |
|---|---|---|---|---|---|---|---|---|
| (pbw) | A | B | C | D | E | F | G | H |
| Ultrafine silica | 0.5 | — | — | — | — | — | — | 2 |
| Spherical silica A | 6 | 5 | 10 | 2 | 5 | — | 20 | 10 |
| Spherical silica B | 15.5 | 12 | 5 | 10 | 10 | 23 | 5 | 15 |
| Spherical silica C | — | 3 | 7 | — | 4 | — | 3 | 15 |
| Spherical silica D | 78 | 80 | 78 | — | — | 77 | 78 | 58 |
| Spherical silica E | — | — | — | — | 81 | — | — | — |
| Spherical silica F | — | — | — | 88 | — | — | — | — |
| Viscosity ratio | 5.2 | 3.8 | 5.9 | 4.3 | 4.7 | 1.5 | 7.5 | 12.6 |
| Specific surface area (m$^2$/g) | 5.0 | 3.8 | 5.4 | 1.9 | 4.2 | 1.3 | 8.1 | 17.8 |

Ultrafine silica: silazane-treated aerosil having a specific surface area of 200 m$^2$/g

| | Mean particle size | Specific surface area |
|---|---|---|
| Spherical silica A: | 0.1 μm | 28 m$^2$/g |
| Spherical silica B: | 0.7 μm | 6.5 m$^2$/g |
| Spherical silica C: | 2.5 μm | 28 m$^2$/g |
| Spherical silica D: | 27 μm | 1.0 m$^2$/g |
| Spherical silica E: | 25 μm | 1.7 m$^2$/g |
| Spherical silica F: | 21 μm | 0.7 m$^2$/g |

Eight epoxy resin compositions were prepared by blending the fillers A to H with an epoxy resin and other ingredients as shown in Table 2. The compositions were tested for physical properties by the following methods.

Spiral Flow

A spiral flow was measured by transfer molding an epoxy resin composition at a temperature of 175° C. and a pressure of 70 kg/cm$^2$.

Gel Time

An epoxy resin composition was heated on a hot plate at 175° C. until the composition gelled.

Melt Viscosity

Using a Kouka type flow tester with a nozzle having a diameter of 1 mm, a viscosity was measured at a temperature of 175° C. and a pressure of 10 kg.

Internal and External Voids

Using a multi-plunger molding machine, an epoxy resin composition was transfer molded over a couple of QFP matrix frames (ten samples) at a temperature of 175° C. and a pressure of 70 kgf/cm$^2$. The thus molded package was examined for defects. Using a ultrasonic flaw detector, the number of internal voids was counted. The number of external voids was counted by visual observation. The number of voids is the sum of voids in or on ten samples.

Wire Deformation

The molded QFP package was observed by a soft X-ray analyzer to examine whether the gold wire, connected to the QFP were deformed.

Die Pad Deformation

The molded QFP package was sectioned to examine whether the die pads were deformed.

The results are shown in Table 2.

TABLE 2

| | | | Example | | | | | Comparative Example | | |
|---|---|---|---|---|---|---|---|---|---|---|
| | | | 1 | 2 | 3 | 4 | 5 | 1 | 2 | 3 |
| Composition (pbw) | Filler | type | A | B | C | D | E | F | G | H |
| | | amount | 800 | 800 | 500 | 850 | 800 | 800 | 800 | 500 |
| | YX4000HK | | 46.5 | 46.5 | 46.5 | 46.5 | 46.5 | 46.5 | 46.5 | 46.5 |
| | Mylex 225L | | 49.3 | 49.3 | 49.3 | 49.3 | 49.3 | 49.3 | 49.3 | 49.3 |
| | BREN-S | | 4.2 | 4.2 | 4.2 | 4.2 | 4.2 | 4.2 | 4.2 | 4.2 |
| | Antimony trioxide | | 3 | 3 | 3 | 3 | 3 | 3 | 3 | 3 |
| | Carnauba wax | | 1.5 | 1.5 | 1.5 | 1.5 | 1.5 | 1.5 | 1.5 | 1.5 |
| | Triphenyl phosphine | | 1.3 | 1.3 | 1.3 | 1.3 | 1.3 | 1.3 | 1.3 | 1.3 |
| Properties | Spiral flow (cm) | | 112 | 123 | 140 | 125 | 106 | 146 | 97 | 62 |
| | Gel time (sec.) | | 18 | 18 | 19 | 18 | 17 | 19 | 18 | 15 |
| | Melt viscosity (poise) | | 110 | 98 | 75 | 85 | 115 | 82 | 195 | 380 |
| | Internal voids (number) | | 0 | 0 | 0 | 0 | 0 | 18 | 3 | 21 |
| | External voids (number) | | 0 | 0 | 0 | 0 | 0 | 8 | 4 | 19 |
| | Wire deformation | | no | no | no | no | no | found | found | found |
| | Die pad deformation | | no | no | no | no | no | no | found | found |

YX4000HK

TABLE 2-continued

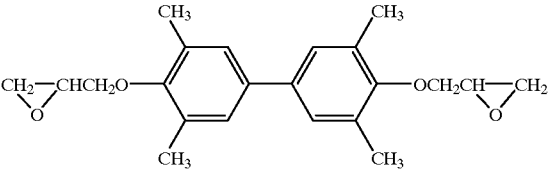

softening point 105° C.
epoxy equivalent 190
Yuka Shell Epoxy K.K.

Mylex 225L

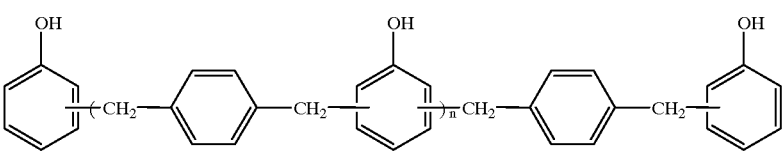

softening point 70° C.
hydroxyl equivalent 170
Mitsui Toatsu K.K.

Letter n is the number such that the compound has a hydroxyl equivalent of 170.
BREN-S

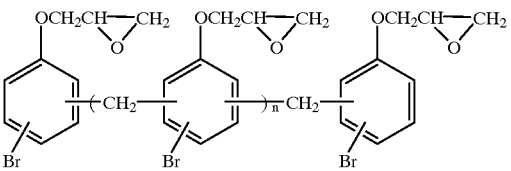

softening point 82° C.
epoxy equivalent 280
n; nearly 4 (average)
Nihon Kayaku K.K.

Although some preferred embodiments have been described, many modifications and variations may be made thereto in the light of the above teachings. It is therefore to be understood that within the scope of the appended claims, the invention may be practiced otherwise than as specifically described.

We claim:

1. In an epoxy resin composition comprising an epoxy resin, aphenolic resin as a curing agent, and an inorganic filler as essential components, the improvement wherein the inorganic filler has a specific Surface area of 1.5 to 6 m$^2$/g as measured by the BET method and is such that when a kneaded mixture of 75% by weight of the inorganic filler and 25% by weight of a bisphenol F type liquid epoxy resin is measured for viscosity at shear rates of 0.6/sec. and 10/sec. at a temperature of 25±0.05° C. by an E type viscometer, the ratio of the viscosity at 0.6/sec. to the viscosity at 10/sec. is at least 3.5/1, the amount of the inorganic filler loaded is 80 to 90% by weight of the epoxy resin composition, and the epoxy resin composition has a melt viscosity of at most 150 poise at 175° C.

2. A method of encapsulating a semiconductor device having a matrix frame which comprises encapsulating said device with an epoxy resin composition according to claim 1.

3. An encapsulated semiconductor device having a matrix frame wherein the device is encapsulated with an epoxy resin composition according to claim 1.

4. The epoxy resin composition of claim 1 wherein the epoxy resin is a naphthalene type epoxy resin or biphenyl type epoxy resin.

5. The epoxy resin composition of claim 1 wherein the curing agent is a phenol novolak resin, cresol novolak resin, phenol aralkyl resin, naphthalene type phenol resin, cyclopentadiene type phenol resin or triphenolalkane type phenol resin.

6. The epoxy resin composition of claim 1 wherein the filler has a mean particle size of 4 to 30 μm, and such a particle size distribution that fine particles having a particle size of at most 3 μm account for 10 to 40% by weight of the filler and the maximum particle size is less than 100 μm.

7. The epoxy resin composition of claim 6 wherein said fine particles having a particle size of at most 3 μm are blended in a proportion of 0 to 5% by weight of an ultrafine silica having a mean particle size of less than 0.05 μm and a specific surface area of 50 to 300 m$^2$/g, 1 to 15% by weight of a microparticulate filler having a mean particle size of 0.05 to 0.3 μm and 5 to 20% by weight of a filler having a mean particle size of 0.5 to 3 μm so that the total amount is 10 to 40% by weight of the filler.

8. The epoxy resin composition of claim 1 wherein the epoxy resin and phenolic resin curing agent are provided in the composition such that 0.5 to 1.6 mol of phenolic hydroxyl group in the phenolic resin is available per mol of epoxy group in the epoxy resin.

9. The epoxy resin composition of claim 1 wherein the ratio of the viscosity at 0.6/sec. to the viscosity at 10/sec. is from 3.6/1 to 6.5/1.

* * * * *